United States Patent Office 2,833,718
Patented May 6, 1958

2,833,718

LUBRICATING COMPOSITION CONTAINING POLYETHYLENE RESINS

Arnold J. Morway, Clark, and Thomas E. Witts, Metuchen, N. J., and David W. Young, Homewood, Ill., assignors to Esso Research and Engineering Company, a corporation of Delaware No Drawing. Application June 17, 1955
Serial No. 516,308

7 Claims. (Cl. 252—39)

This invention relates to lubricating compositions, and particularly to lubricating grease compositions having outstanding high temperature and structural stability characteristics. More specifically, this invention pertains to lubricating grease compositions which are prepared by thickening a lubricating oil with a combination of metal soaps of high molecular weight fatty acids, metal soap-salt complexes or metal mixed salt complexes and a polyethylene resin.

This application is a continuation-in-part of copending application S. N. 317,564, filed October 29, 1952, and now abandoned.

For certain lubricating purposes grease compositions having outstanding structural stability and high temperature properties are essential. In those applications where a lubricating grease composition is subjected to high rates of shear and to high temperatures, a grease that is deficient in these properties will not furnish satisfactory lubrication. In these lubricating services, greases have been found to lose their grease-like structure resulting in a separation of the soap from the oil, which may cause failure of the metal parts being lubricated. If the grease has unsatisfactory high temperature properties, the melting of the grease may also cause failure of the lubricated parts.

In the prior art various methods of preparing grease lubricants having high dropping points and good structure stability have been disclosed. In general, the prior art teaches that high dropping points and a high degree of structural stability are obtained by the utilization of a high soap content or inorganic thickeners in the grease formulation. For some lubricating services it would be desirable to be able to use a grease composition having a lower soap content and no inorganic thickening agents, the latter often having undesirable properties. From an economic point of view, a lubricating grease composition with a low soap content and having high temperature and structure stability properties would be very desirable, since the thickening constituent of the grease is usually the most expensive item.

It has now been found and forms the object of this invention that lubricating grease compositions having a high degree of structural stability and a high dropping point may be prepared with lower soap contents by incorporating into the formulations a minor amount of a polyethylene resin. By this method the soap content of a lubricating grease formulation may be substantially reduced without loss of structural stability or reduction in the dropping point. It has also been found that the polyethylene resin may be either incorporated as such in the grease batch or added in the form of polyethylene bags containing the metal hydroxide used for saponifying the fatty acids.

Briefly stated, the instant invention involves the preparation of a lubricating grease by dispersing small amounts of a polyethylene resin in the grease composition. The base grease formulation is first prepared by known methods, and an oil dispersion of the polyethylene resin is then intimately admixed therewith. Though the separate dispersion of the grease-forming soap in the mineral oil followed by the addition of polyethylene resin is one of the preferred methods of preparing the greases of the invention, it is also possible to add the polyethylene resin during the grease manufacture.

The polyethylene resins utilized in the formation of the greases of this invention are known in the art. Techniques for the polymerization of ethylene into various resinous compounds are old. Some of these techniques are described in detail in U. S. Patent 2,153,553, to Fawcett et al. In general, the formation of the polyethylene resins is accomplished by subjecting ethylene to temperatures in the neighborhood of about 200° C. to 600° C. and pressures of about 200 atmospheres or more. The polyethylene resins useful in the preparation of the compositions of this invention are those resins having molecular weights within a range of from about 5,000 to 50,000 Staudinger. Those polyethylene resins with molecular weights of from 6,000 to 25,000 are utilized in preparing the preferred grease compositions.

The amount of the polyethylene incorporated into the grease compositions of the invention depends, of course, upon the characteristics desired in the final product. Ordinarily, from about 0.02 to about 10 wt. percent of the polyethylene resin, based on the weight of the total composition, will be used. When a much lower soap content than is ordinarily employed is desired, the preferred grease composition of the invention is prepared with from about 5 to 10 wt. percent of a polyethylene resin having a molecular weight of about 10,000 to 22,000 Staudinger. If, however, polyethylene resin sheets are used in the form of bags or containers to hold the metal hydroxide, the amount of polyethylene resin employed may range from about 0.02 to 1.0 wt. percent. In general, as the molecular weight of the polyethylene resin increases lesser amounts can be employed to obtain greases having similar structural stability and dropping point characteristics.

The lubricating oil which may be used as the menstruum for dispersing the thickening agents of this invention may be any of the well known lubricating oils with which the art is familiar. Petroleum distillates from either naphthenic or paraffinic base stocks having a viscosity from about 35 to 250 SUS at 210° F. may be used as well as mixtures of the same. The base oil chosen will depend upon the lubricating service contemplated. It has also been found that if small amounts of a mineral oil are used as a dispersant for the resin, a stable lubricating grease may be obtained with a synthetic lubricating oil base such as diesters, complex esters and the like.

The soap portion of the greases of invention may be selected from any of the commonly known grease-making soaps, such as the metal soaps of high molecular weight fatty acids. Operable metals include the alkali metals: sodium, lithium and potassium; and the alkaline earth metals: calcium, barium, strontium and magnesium. The high molecular weight fatty acids may be selected from a large variety of $C_{12}$ to $C_{30}$, preferably $C_{16}$ to $C_{22}$, saturated or unsaturated grease-making acids such as lauric acid, myristic acid, palmitic acid, stearic acid, hydroxy stearic acid, oleic acid, hydrogenated fish oil acids, linoleic acid, arachidic acid, behenic acid, etc. Glycerides of the above acids, vegetable fat, tallow, etc. may also be employed as the saponifiable material. In general, the amount of soap in the thickener blend of the invention will vary from about 2 to 20 wt. percent, preferably from about 4 to 15 wt. percent; the percentages being based on the weight of the total composition.

The concept of the instant invention is of particular interest with respect to the so-called complex soap thickeners with which the art is familiar. Such complex thickening agents include the sodium complex soap prepared by the high temperature saponification of rapeseed oil. In accordance with one feature of this invention, it has been found that the amount of these complex soap thickeners required to thicken lubricating oils may be materially reduced by replacing a portion of the conventional soap thickener with polyethylene resin without any substantial decrease in structural stability or lowering of the dropping point of the final grease composition.

Other suitable complex thickening agents include:

(a) The soap-salt complexes prepared from the metal salts of low molecular weight carboxylic acids having from 1 to 3 carbon atoms per molecule, and metal soaps of high molecular weight carboxylic acids having from 12 to 30 carbon atoms per molecule, wherein the mol ratio of the low to high molecular weight acids is about 1:1 to 40:1, preferably about 8:1 to 25:1;

(b) The mixed salt complexes prepared from the metal salts of low molecular weight carboxylic acids having from 1 to 3 carbon atoms per molecule, and metal salts of intermediate molecular weight carboxylic acids having from 7 to 10 carbon atoms per molecule, wherein the mol ratio of low to intermediate molecular weight acids is about 2:1 to 40:1, preferably about 4:1 to 25:1;

(c) The soap-salt complexes prepared from a metal salt of acetic acid, metal salts of medium molecular weight carboxylic acids having from 3 to 10 carbon atoms per molecule and metal soaps of high molecular weight carboxylic acids having from 12 to 30 carbon atoms per molecule; wherein the mol ratio of acetic to the medium and high molecular weight acid is about 4:1 to 40:1, the mol ratio of medium to high molecular weight acids is about 0.5:1 to 10:1, and the difference in number of carbon atoms per molecule between the high and medium molecular weight carboxylic acids is at least 7, preferably about 7 to 15.

The exact constitution and chemical nature of the so-called complex grease thickeners are not fully understood. Chapter 16 of Boner's "Manufacture and Application of Lubricating Greases" (Reinhold Publishing Corporation, New York), is devoted to a discussion of the known complex soap and soap-salt grease thickeners, the theories concerning their structure and their grease-thickening characteristics. By the term "complex grease thickener" as used in this application, it is meant to include the complex soap derived from rapeseed oil as well as the metal soap-salt and mixed salt complex thickeners described above.

The high molecular weight carboxylic acids useful for preparing the complex thickeners described above are those saturated and unsaturated, grease-making fatty acids that are commonly known to the art and which are described above with respect to the preparation of conventional metallic soap grease thickeners. In general, these fatty acids also have from about 12 to 30 carbon atoms, preferably about 16 to 22 carbon atoms, per molecule. Preferred acids are mixtures derived from natural sources, such as hydrogenated fish oil acids, animal fatty acids and the like.

The intermediate molecular weight acids are those aliphatic monocarboxylic acids containing from about 7 to 10 carbon atoms, preferably about 8 or 9 carbon atoms, per molecule. Either saturated or unsaturated fatty acids may be utilized, although the saturated fatty acids are preferred. Suitable acids include: 5-methyl-2-hexanoic, heptanoic, octanoic, 2-ethyl-hexanoic, $C_8$ Oxo, nonanoic, decanoic, $C_{10}$ Oxo acids, etc. The Oxo acids are those formed by the oxidation or alkali fusion of the aldehydic and ketonic products derived from the Oxo process of synthesis with carbon monoxide, hydrogen and olefins in the presence of a cobalt catalyst, the olefinic feed being $C_7$ and $C_9$ polymers of propylene, with or without some butylene, for making $C_8$ and $C_{10}$ Oxo acids.

The medium molecular weight carboxylic acids, as designated for the purposes of this invention, include straight and branched chain saturated aliphatic carboxylic acids, hydroxy aliphatic mono- and poly-carboxylic acids, aromatic mono- and poly-carboxylic acids and anhydrides thereof, and heterocyclic acids containing from about 3 to 10, preferably about 6 to 9, carbon atoms per molecule. Suitable carboxylic acids include: pentanoic, hexanoic, heptanoic, octanoic, nonanoic, decanoic, isobutyric, $C_5$ Oxo, $C_8$ Oxo, $C_9$ Oxo, $C_{10}$ Oxo, glyceric, benzoic, hydroxy benzoic, toluic, o-phthalic, phthalic anhydride, terephthalic, furoic, thiophene carboxylic, etc.

The low molecular weight carboxylic acids capable of being used in the preparation of the complex thickeners include saturated and unsaturated carboxylic acids having from about 1 to 3 carbon atoms per molecule, such as formic, acetic, acrylic and similar acids including their hydroxy derivatives, e. g. lactic acid. Monocarboxylic acids are particularly useful, and acetic acid is especially preferred. The acetic acid can be either glacial acetic acid or an aqueous solution of acetic acid.

The alkaline earth metals such as calcium, barium, and strontium are particularly useful for preparing the complex grease thickeners. Calcium hydroxide is especially preferred. The alkali metals such as sodium, potassium and lithium can also be employed, though they are not as effective for the preparation of these complex thickeners as the alkaline earth metals. Metals such as magnesium and zinc are also useful for this purpose.

A valuable lubricating grease composition having outstanding structural stability and high temperature properties is disclosed in detail in U. S. Patent 2,265,791. This lubricating grease composition is prepared by thickening a mineral lubricating oil with a complex soap derived from rapeseed oil. The formulation of the grease is as follows:

| Ingredients: | Percent by weight |
| --- | --- |
| Rapeseed oil | 29.00 |
| Sodium hydroxide | 5.92 |
| Sodium petroleum sulfonate | 1.00 |
| Phenyl-alpha-naphthylamine | 1.00 |
| Metal deactivator [1] | 0.55 |
| Mineral oil (55 SUS/210° F.) | 62.58 |

[1] Disalicylal propylene diamine, described in U. S. Patent 2,282,513.

The rapeseed oil, sodium petroleum sulfonate and one-half the mineral oil is charged to a fire-heated grease kettle and heated with stirring to about 150° F. The sodium hydroxide, in the form of a 25% water solution, is then added and the mixture heated with stirring until the water is driven off. The balance of the oil is then added and the mass heated to about 480°–500° F. Heating is then discontinued, the other additive materials added and the formulation allowed to cool to about 200° F. It is then drawn from the kettle and pan cooled to room temperature.

This grease gives the following inspections:

ASTM penetration: (mm./10 @ 77° F.):
   Unworked _____ 185.
   Worked (60 strokes)[1] _____ 200.
   Worked (800,000 strokes)[1] __ 220.
Dropping point, ° F _____ 500+.
Water solubility (210° F.) _____ Completely soluble.
Norma Hoffmann oxidation test
   (hours to 5 lbs. pressure drop)_ 185.
ABEC test [2] _____ Excellent, channeling type grease, no leakage through seals.

[1] Fine-hole worker-plate.
[2] Test allows observation of grease in an operating bearing at 80° F., 220° F., and 250° F.

As is noted from the inspections above, this lubricating grease composition has outstanding structural stability and an excellent dropping point. It is also to be noted that this composition contains approximately 30% of the expensive sodium rapeseed oil soap. The soap content of this grease was substantially reduced without loss in the structural stability or high temperature properties as is set out below. Hereinafter this grease composition is referred to as grease A.

EXAMPLE I

A polyethylene resin having a molecular weight of 12,000 Staudinger was dispersed in a mineral oil, having a viscosity at 210° F. of 40 SUS, by heating to 250° F. with stirring. Complete dispersion of the resin in the mineral oil occurred in approximately 30 minutes. The product was allowed to cool and it set up on cooling to a light gel structure. This formulation contained 10% of the resin and 90% of the mineral oil. This composition had a dropping point of 110° F. but was semifluid in consistency. Although useful for many applications this lubricating grease was too soft for severe lubricating use and its dropping point was too low for high temperature operations. This composition will hereinafter be referred to as grease B.

EXAMPLE II

Grease A and grease B were mixed together gradually and systematically to form three compositions according to the concept of this invention. The mixture was accomplished by subjecting the two samples to the action of a Hobart blender well known in the lubricating art. Formulations and inspections on the greases are set out below:

| Blend No. | 1 | 2 | 3 |
|---|---|---|---|
| Formulation: | | | |
| Grease A | 50.00 | 25.00 | 12.50. |
| Grease B | 50.00 | 75.00 | 87.50. |
| Composition of Blend: | | | |
| Percent Complex soap | 15.00 | 7.50 | 3.75. |
| Percent Polyethylene (12,000 M. W.) | 5.0 | 7.50 | 8.75. |
| Percent Phenyl-alpha-naphthylamine | 0.50 | 1.00 | 0.50. |
| Percent Metal Deactivator [1] | 0.25 | 0.50 | 0.25. |
| Percent Sodium Petroleum Sulfonate | 0.50 | 0.25 | 0.25. |
| Percent Mineral Oil (55 SUS/210° F.) | 78.75 | 83.25 | 86.50. |
| Inspections: | | | |
| ASTM Penetration: (mm./10 @ 77° F.)— | | | |
| Unworked | 233 | | 390. |
| Worked (60 strokes) | 260 | 280 | 396. |
| Worked (80,000 strokes) | 360 | 380 | 435. |
| Dropping Point, °F | 424 | 390 | 376. |
| Water Solubility | Soluble | Partially soluble. | Soluble in boiling water; Insoluble in cold water. |
| Norma Hoffmann Oxidation Test (Hours to 5 p. s. i. drop) | 175 | 200 | 240 |
| ABEC Test | | Excellent Lubrication | |

[1] Disalicylal propylene diamine.

It will be noted that grease 1 contains only 15% soap, grease 2 contains only 7.5% soap and grease 3 contains only 3.75% of the complex soap. However, as the inspection data show, these grease formulations have excellent structural stability and dropping points in the neighborhood of 400° F. making them eminently satisfactory for superior lubricating purposes.

EXAMPLE III

10% of a polyethylene resin having a molecular weight of 18,500 Staudinger was dispersed in a mineral oil, having a viscosity at 210° F. of 40 SUS, by heating to 325° F. with stirring. The grease dispersion was accomplished after approximately 30 minutes of heating. The mass was then pan-cooled and it set into a firm gel structure having an ASTM dropping point of 125° F. This grease formulation, referred to hereinafter as grease C, was blended with grease A above by means of the Hobart grease mill. The formulation and inspections of this composition are set out below.

| Blend No. | 1 |
|---|---|
| Formulation: | |
| Percent Grease A | 13.04. |
| Percent Grease C | 86.96. |
| Composition of Blend: | |
| Percent Complex soap | 3.9. |
| Percent Polyethylene (18,500 M. W.) | 9.0. |
| Percent Phenyl-alpha-naphthylamine | 0.25. |
| Percent Metal Deactivator [1] | 0.125. |
| Percent Sodium Petroleum Sulfonate | 0.25. |
| Percent Mineral Oil | 86.475. |
| Inspections: | |
| ASTM Penetration: (mm./10 @ 77° F.)— | |
| Unworked | 309. |
| Worked (60 strokes) | 321. |
| Worked (80,000 strokes) | 352. |
| Dropping Point, °F | 358. |
| Water Washing Test, Percent Loss | None up to 130° F., water temperature. |
| Norma Hoffmann Oxidation Test (Hours to 5 p. s. i. drop). | 200. |
| ABEC Test | Excellent lubrication, Channelling type grease. |

[1] Disalicylal propylene diamine.

EXAMPLE IV

A polyethylene resin having a molecular weight of about 19,000 Staudinger was dispersed in a mineral oil having a viscosity at 210° F. of 55 SUS in an amount such that 10% of the resin was present. The dispersion was accomplished by heating to 350° F. with stirring for 30 minutes. On cooling an excellent smooth gel structure was obtained which had a dropping point of 140° F. This formulation is hereinafter referred to as grease D. Grease D was blended with grease A by milling in a Hobart blender in different proportions. The formulation and inspection of these blends are set out below.

| Blend No. | 1 | 2 |
|---|---|---|
| Formulation: | | |
| Percent Grease A | 10.00 | 6.67 |
| Percent Grease D | 90.00 | 93.33 |
| Composition of Blend: | | |
| Percent Complex soap | 3.00 | 2.00 |
| Percent Polyethylene (19,000 M. W.) | 9.00 | 9.33 |
| Percent Phenyl-alpha-naphthylamine | 0.10 | 0.06 |
| Percent Metal Deactivator [1] | 0.05 | 0.03 |
| Percent Sodium petroleum sulfonate | 0.25 | 0.25 |
| Percent Mineral Oil (55 SUS/210° F.) | 87.60 | 88.33 |
| Inspections: | | |
| ASTM Penetration: (mm./10 @ 77° F.)— | | |
| Unworked | 285 | 310 |
| Worked (60 strokes) | 290 | 314 |
| Worked (80,000 strokes) | 340 | 355 |
| Dropping Point, °F | 359 | 240 |
| Water Washing Test, Percent Loss [2] | 0 | 0 |
| Norma Hoffmann Oxidation Test (Hours to 5 p. s. i. drop) | 210 | 200 |
| ABEC Test | | Excellent lubrication, no leakage through seals. |

[1] Disalicylal propylene diamine.
[2] 80° F. water temperature.

EXAMPLE V

To illustrate the effect of the inclusion of the resin in the cut back grease, grease A was mixed with 50% of mineral oil alone, instead of with oil and resin as in grease 1 of Example II. The resulting blend was subjected to the same mixing action as grease 1 in the Hobart blender, and contained 15% soap which is the same amount of soap as in grease 1 of Example II. This composition was subject to the standard inspections and gave the following results.

Inspections:
```
  ASTM penetration: (mm./10 @ 77° F.)—
    Unworked _____ 290
    Worked (60 strokes) _____ 292
    Worked (80,000 strokes) _____ Fluid
  Dropping Point, ° F. _____ 360
  Water washing test, percent loss_____ 100
  Norma Hoffmann oxidation test (hours to 5
    p. s. i. drop)_____ 140
```

A comparison of these inspections with those of grease 1 of Example II clearly points out the advantages of this invention.

As noted above, the polyethylene resins can also serve as packaging material for the metal hydroxide as well as directly contributing to the thickening of the base oil. The use of polyethylene bags to package the metal hydroxide provides a simple means of charging the metal hydroxide to the grease kettle and avoids thereby the problems of dustiness and disposal that result when paper bags or other containers are employed for the same purpose. Although it is known in the prior art to use bags of water-soluble compositions for introducing powdered ingredients into a mixer, the material forming the bag did not contribute any positive benefit to the final product. In accordance with one feature of this invention, therefore, the polyethylene serves the dual purpose of packaging the metal hydroxide and thickening the oil to grease consistency.

In general, the grease manufacturing process follows the usual procedure with the exception that the metal hydroxide, e. g. hydrated lime, which is employed for saponification of the fatty acid material to form the soap thickener, is charged in polyethylene bags. The action of the revolving grease kettle paddles immediately breaks open the bags, and the metal hydroxide is completely dispersed throughout the reaction mixture in a very short period of time. With subsequent rises in temperatures, the polyethylene bag disintegrates and is also dispersed throughout the grease batch. Thus, the polyethylene also acts as a supplemental thickener. By charging the metal hydroxide in the polyethylene bags, no alkaline dustiness contaminates the atmosphere, there is no problem of disposing of empty paper bags or sacks, and no material is lost, which in turn eliminates costly kettle hold-up, for free alkali adjustment on the batch.

EXAMPLE VI

To illustrate the use of polyethylene bags containing the metal hydroxide, the following grease composition was prepared having the formulation and properties tabulated below:

```
                                            Percent
Formulation:                                weight
  Animal fat _____ 10.10
  Hydrated lime _____  1.41
  Water _____  1.01
  Polyethylene (18,000 M. W.) _____  0.02
  Paraffinic lubricating oil (40 SUS/210° F.)_ 3.44
  Naphthenic lubricating oil (1200 SUS/100°
    F.) _____ 84.02
```

Preparation

The paraffinic lubricating oil, the animal fat and one third of the naphthenic lubricating oil were charged to a grease kettle. The mixture was heated to a temperature of about 150° F., and the hydrated lime in polyethylene bags was added. Heating was continued to a temperature of 320° F. The resulting grease batch was then cooled to 210° F., and the water added to weld the grease. The balance of the naphthenic lubricating oil was added. The grease was then cooled to a temperature of about 180° F. and filtered.

Properties:
```
  Worked penetration, 77° F. (60 strokes)_____ 290
  Dropping point, ° F_____ 200
  Structural stability_____ Excellent
```

This grease was more adhesive than the same product without the polyethylene. In addition, this grease maintained its structure rather than separating into soap and oil when it is heated above the boiling point of the weld water (212° F.).

EXAMPLE VII

The use of polyethylene bags containing metal hydroxide in grease manufacture is of particular importance in the preparation of complex type thickeners, since much larger amounts of metal hydroxide are required to prepare these thickeners. The following grease composition, having the formulation and properties tabulated below, was prepared to show the advantages of adding the hydrated lime in polyethylene bags directly to the grease kettle in the preparation of a grease containing a calcium acetate-caprylate complex thickener.

```
                                            Percent
Formulation:                                weight
  Glacial acetic acid_____ 12.0
  Caprylic acid ¹_____  6.0
  Hydrated lime _____  9.7
  Polyethylene (18,000 M. W.) _____  1.0
  Phenyl-alpha-naphthylamine _____  0.5
  Mineral lubricating oil (55 SUS/210° F.)_ 70.8
```

¹ Commercial caprylic acid: 15% lauric acid, 55% capric acid, 30% caprylic acid.

Preparation

The lime in polyethylene bags and the lubricating oil were charged to a fire heated grease kettle with stirring. As the kettle paddles broke open the polyethylene bags and dispersed the lime, the mixture was heated to a temperature of about 150° F. The caprylic acid and then the acetic acid were added, and the temperature raised to about 460° F. During this temperature rise, the polyethylene was completely dispersed in the grease batch. The resulting grease was then cooled to 275° F. with stirring. At this point, the phenyl-alpha-naphthylamine was added. The grease was further cooled to 200° F. and then Gaulin homogenized at 6000 p. s. i.

Properties:
```
  Appearance _____ Excellent, smooth grease
  Penetrations (77° F., mm./10):
    Unworked _____ 295
    Worked (60 strokes) _____ 310
    Worked (100,000 strokes) _____ 345
  Dropping point, ° F. _____ 500+
  Water solubility (boiling water) _____ Nil
  Phase changes (up to 400° F.) _____ None
  Wheel bearing test (660 R. P. M., 220° F., 6 hrs.) Pass
  Timken test (40 lbs. load) _____ Pass
  Lubrication life (10,000 R. P. M., 250° F., hrs.) 2200
  Norma Hoffmann oxidation test (hours to 5 p. s. i.
    drop in oxygen pressure) _____ 350
```

To summarize briefly, the instant invention has as its object the formulation of a grease composition having a low soap content and yet having a high degree of structural stability and a high dropping point. Preparation of these compositions is accomplished by blending with the commonly used soap thickeners a minor amount of a polyethylene resin. Formulation of the finished composition will contain a mineral oil as the menstruum for the thickening agent, and from about 5 to 40 wt. percent, preferably about 10% to 30%, of a thickening blend which comprises a metallic soap of a substantially saturated fatty acid and a polyethylene resin having a molecular weight in excess of 6,000 Staudinger. The blend will contain from 0.02% to 10% of a polyethylene resin. As the molecular weight of the resin increases lesser amounts will need to be incorporated into the formulation to obtain equivalent effects. The grease compositions of this invention have the advantage of serving as excellent high temperature lubricants and of being prepared with greatly reduced amounts of the expensive soap type thickener.

The invention is not necessarily limited to the specific conditions and materials of the foregoing examples. These conditions and materials may be varied within the limits indicated in the general portions of the specification. Moreover, conventional grease additives such as oxidation inhibitors, pour point depressors, corrosion inhibitors and the like can be effectively incorporated in the grease compositions of this invention.

What is claimed is:

1. A lubricating grease composition which comprises a mineral lubricating oil thickened to a grease consistency with about 10 to 30 wt. percent of a combination of (1) a mixed-salt complex grease thickener consisting of metal salt of low molecular weight fatty acid and metal salt of higher molecular weight fatty acid wherein said metal is selected from the group consisting of alkali metals and alkaline earth metals and (2) a polyethylene resin having a molecular weight of about 5,000 to 50,000, said grease composition containing about 0.02 to 10 wt. percent of said polyethylene resin.

2. The lubricating grease composition of claim 1 wherein said complex grease thickener is a sodium complex soap derived from rapeseed oil.

3. The lubricating grease composition of claim 1 wherein said complex grease thickener is an alkaline earth mixed salt complex of a low molecular weight carboxylic acid having from 1 to 3 carbon atoms per molecule and an intermediate molecular weight carboxylic acid having from 7 to 10 carbon atoms per molecule.

4. The lubricating grease composition of claim 1 wherein said polyethylene resin has a molecular weight of from about 10,000 to 22,000.

5. In a stable, high temperature lubricating grease composition comprising a major proportion of a mineral lubricating oil and about 4 to 15 wt. percent of a sodium complex soap thickener derived from rapeseed oil, the improvement which comprises having combined therein about 5 to 10 wt. percent of a polyethylene resin having a molecular weight within the range of about 6,000 to 25,000.

6. A lubricating grease composition which comprises essentially a mineral lubricating oil thickened to grease consistency with from about 4 to 15 wt. percent of a sodium complex soap derived from rapeseed oil and from about 5 to 10 wt. percent of a polyethylene resin having a molecular weight within the range of about 10,000 to 22,000, said percentages being based on the weight of the total composition.

7. A lubricating grease composition which comprises essentially a mineral lubricating oil thickened to grease consistency with from about 4 to 20 wt. percent of a calcium acetate-caprylate complex grease thickener and about 1.0 wt. percent of a polyethylene resin having a molecular weight of about 18,000, said percentages being based on the weight of the total composition.

References Cited in the file of this patent

UNITED STATES PATENTS

| | | |
|---|---|---|
| 2,197,263 | Carmichael et al. | Apr. 16, 1940 |
| 2,265,791 | Zimmer et al. | Dec. 9, 1941 |
| 2,564,561 | Carmichael et al. | Aug. 14, 1951 |
| 2,627,938 | Frohmader et al. | Feb. 10, 1953 |
| 2,628,187 | Frohmader et al. | Feb. 10, 1953 |